(12) United States Patent
Kim et al.

(10) Patent No.: US 6,937,768 B2
(45) Date of Patent: Aug. 30, 2005

(54) APPARATUS AND METHOD FOR ENCODING/DECODING IMAGE FRAME

(75) Inventors: Sung Deuk Kim, Kyonggi-do (KR); Soo Young Huh, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 642 days.

(21) Appl. No.: 10/013,727

(22) Filed: Dec. 13, 2001

(65) Prior Publication Data

US 2002/0085635 A1 Jul. 4, 2002

(30) Foreign Application Priority Data

Dec. 28, 2000 (KR) ........................................ 2000/83530

(51) Int. Cl.[7] .............................. G06K 9/36; G06K 9/46
(52) U.S. Cl. ........................ 382/232; 382/233; 382/236; 382/250
(58) Field of Search ................................. 382/232, 233, 382/236, 246, 250, 251, 282, 305; 375/240.16, 240.2, 240.25

(56) References Cited

U.S. PATENT DOCUMENTS 5,973,742 A * 10/1999 Gardyne et al. ........ 375/240.15
6,104,752 A *  8/2000 Yamagishi .................. 375/240
6,131,151 A * 10/2000 Graef .......................... 711/173

* cited by examiner

*Primary Examiner*—Phuoc Tran
(74) *Attorney, Agent, or Firm*—Fleshner & Kim, LLP

(57) ABSTRACT

An apparatus and a method of encoding/decoding an input image frame in an image data processing system are disclosed. Using the apparatus and the method of the present invention, a total memory space of the memories required for encoding/decoding the input image frame is optimized using a slice memory. The encoder/decoder according to the present invention includes a slice memory storing each image slice of a restored image frame having T image slices and a first frame memory storing the restored image frame by copying each image slice stored in the slice memory until all of the T image slices are copied.

16 Claims, 5 Drawing Sheets

Prev.Recon.Frame(A): 176*144

Curr.Recon.Frame(B): 176*144

Prev.&Curr.Recon.Frame(A):176*144

Curr.Recon.Slice(B):176*144
In this example, T=9 and M=3

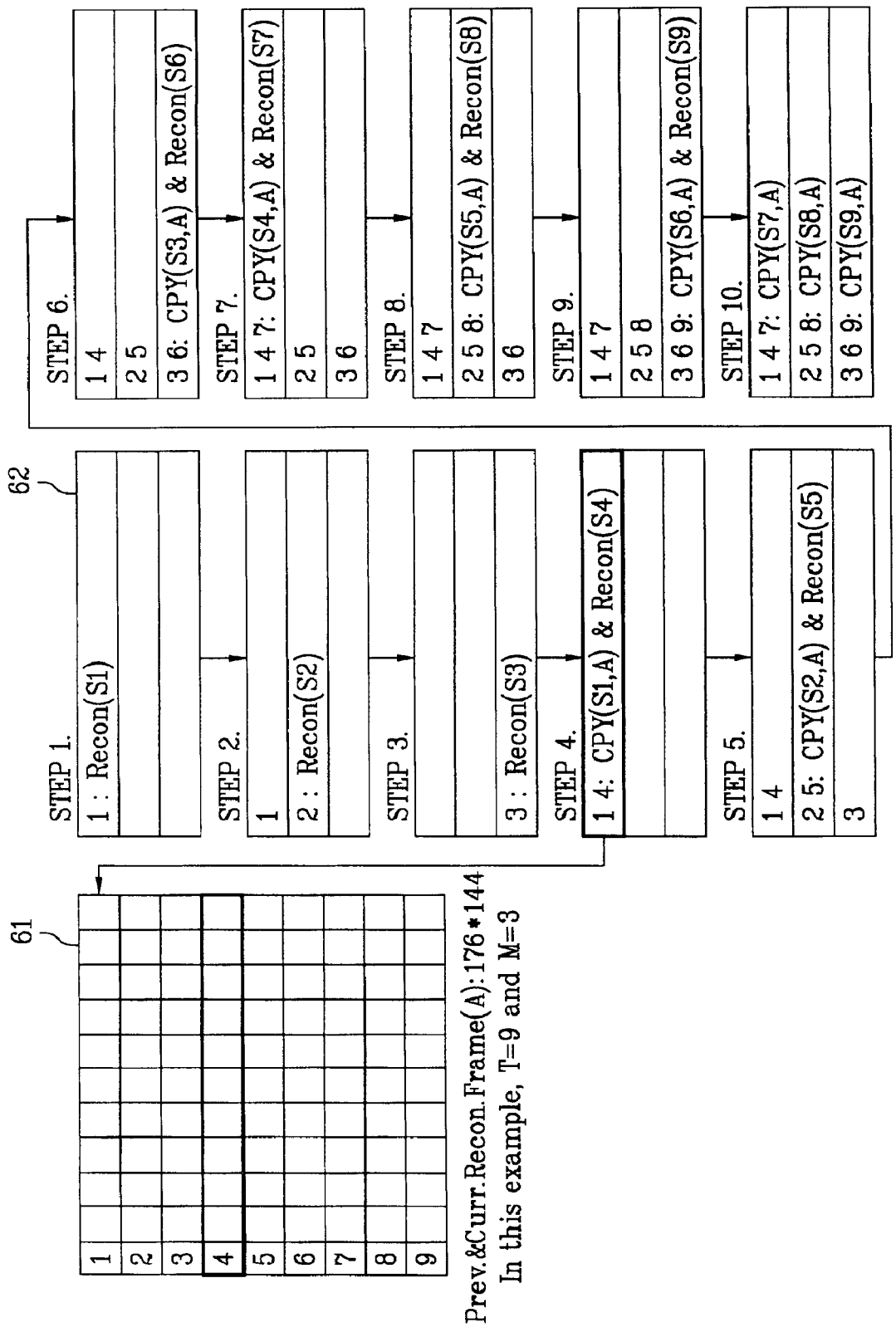

APPARATUS AND METHOD FOR ENCODING/DECODING IMAGE FRAME

This application claims the benefit of the Korean Application No. P2000-83530 filed on Dec. 28, 2000, which is hereby incorporated by reference.

BACKGROUND OF THE INVENTION

1. Field of the Invention

The present invention relates to an encoder and a decoder for an image processing system, and more particularly, to a method of encoding/decoding an image frame for a small image display system.

2. Discussion of the Related Art

A traditional motion picture encoder requires a frame memory for storing a current input image frame received from a camera and another frame memory for storing an image frame restored from a previous input image frame. Each frame memory needs to have a memory space of at least 38016 bytes (176×144×1.5) in order to store a single image frame (YUV 4:2:0 Quarter Common Intermediate Format (QCIF)).

On the other hand, the traditional motion picture decoder requires a frame memory for storing an image frame restored from a current input image frame and another frame memory for storing an image frame restored a previous input image frame.

FIG. 1 illustrates a traditional motion picture encoder. First, the frame memory 2 stores an Nth (current) input image frame received from a camera. Thereafter, the subtractor 3 subtracts the motion-compensated frame from the Nth input image frame stored in the frame memory 2 in order to generate a difference signal.

Then the subtracted (difference) signal passes through the Discrete Cosine Transformer (DCT) 4, the quantizer 5, and the variable length encoder (VLE) 6. The data bit stream outputted from the VLE 6 is stored in the output buffer 7. The bit rate controller adaptively controls the quantization parameter (QP) of the quantizer 5 in order to prevent any data overflow or underflow in the output buffer 7.

The data outputted from the quantizer 5 passes through the inverse quantizer 10 and the Inverse Discrete Cosine Transformer (IDCT) to be restored to the difference signal. Thereafter, the adder 12 adds the restored difference signal with the motion-compensated signal in order to restore the Nth (current) input image frame. The restored Nth input image frame is stored in the frame memory 13 and may input to the PIP circuit 17.

FIG. 2 illustrates a traditional motion picture decoder. According to the FIG. 2, the input buffer 22 initially stores an input bit stream. Then, the stored bit stream passes through the variable length decoder (VLD) 23, the inverse quantizer 24, and the Inverse Discrete Cosine Transformer (IDCT) 25 to be restored to the difference signal, which is generated by the subtractor 3 shown in FIG. 1.

The restored (N−1)th input image frame, which is stored in the frame memory 29, is used by the motion-compensator 30 to generate the motion-compensated frame. The adder 26 adds the restored difference signal and the motion-compensated frame to restore the Nth input image frame. Finally, the frame memory 27 stores the restored Nth input image frame, which will be outputted as an output image frame 28.

Each frame memory in the encoder or decoder requires having a memory space of 38016 bytes (176×144×1.5) for a YUV 4:2:0 QCIF image in order to store an image frame.

FIG. 3 illustrates a frame memory 31 that stores the restored (N−1)th input image frame and the memory region (Y component) of a frame memory 32 that stores the restored Nth input image frame. The size of a QCIF image frame is 176 by 144, and each frame can be divided into 9 image slices.

Since the image decoder requires two image frame memories, for decoding a YUV 4:2:0 QCIF image, a total memory space of 76032 (=176×144×1.5×2) bytes are required for decoding a YUV 4:2:0 QCIF image. Similarly, since the image encoder needs three image frame memories, it requires a total memory space of 114048 (=176×144×1.5×3) bytes for encoding the same. In addition, for a YUV 4:2:0 CIF image, the decoder needs a total memory space of 304128 (=352×288×1.5×2) bytes, and the encoder needs a total memory space of 456192 (=352×288×1.5×3) bytes.

As described above, each frame memory requires a memory space of 38016 bytes for storing a YUV 4:2:0 QCIF image frame. However, a small motion picture system, i.e., a mobile telephone, may not able to afford a memory having a large memory space. Therefore, the image data encoder or decoder of a mobile telephone or any other small image system may require a memory with a smaller memory space.

In addition, it is often necessary to embody the image encoder or decoder in a small chip for the small image system. In this case, each frame memory of such encoder/decoder must be included in the same chip. Therefore, the memory space of the memory device is limited.

SUMMARY OF THE INVENTION

Accordingly, the present invention is directed to a method of minimizing the memory space of each memory required for encoding/decoding image data in a small image system that substantially obviates one or more problems due to limitations and disadvantages of the related art.

An object of the present invention is to provide a method of minimizing the memory space of each memory required for encoding/decoding image data in a small image display system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for encoding an input image frame in an image processing system includes a slice memory storing each image slice of a restored image frame having T image slices and a first frame memory storing the restored image frame by copying each image slice stored in the slice memory until all of the T image slices are copied.

Additionally, the apparatus further includes a second frame memory storing the input image frame; an subtractor generating an difference signal by subtracting a motion-compensated frame from the stored input image frame; a quantizer quantizing the difference signal; a variable length encoder generating an output bit stream by performing a variable length encoding process on the quantized signal; a bit rate controller controlling a quantization parameter for the quantizer; an inverse quantizer restoring the difference signal by performing an inverse-quantizing process on the quantized signal; and an adder generating the restored image frame by adding the restored difference signal to the motion-compensated frame.

In another aspect of the present invention, an apparatus for decoding an input bit stream corresponding to an input image frame in an image processing system includes a slice memory storing each image slice of a restored image frame having T image slices and a frame memory storing the restored image frame by copying each slice stored in the slice memory until all of the N image slices are copied.

Additionally, the apparatus further includes an input buffer storing the input bit stream; a decoder decoding the stored input bit stream; an inverse quantizer inversely quantizing the decoded stream; an inverse discrete cosine transformer (IDCT) performing a IDCT process on the inversely-quantized stream; a motion compensator generating a motion-compensated frame by compensating a previous image frame; and an adder generating the restored image frame by adding the IDCT processed stream to the motion-compensated frame.

In another aspect of the present invention, a method of encoding/decoding an image frame having T image slices in an image processing system includes: (a) restoring an ith slice of the image frame and storing the restored ith slice in an ith memory bank of a slice memory having M memory banks for i=1,2,3, . . . ,M; and (b) copying a [M(k−1)+j]th slice stored in a jth bank of the slice memory to a frame memory, restoring a [Mk+j]th slice of the image frame, and storing the restored [Mk+j]th slice in the jth bank of the slice memory for j=1,2,3, . . . ,M and k=1.

The method further includes: (c) repeating the step (b) for k=2, 3, 4 . . . until all of the T image slices are restored; and (d) copying a MK+lth slice stored in a lth bank of the slice memory to the frame memory for l=1,2,3, . . . ,L, where MK+L=T and L≦M.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 7 illustrates a method of restoring an image frame and storing the restored image frame according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
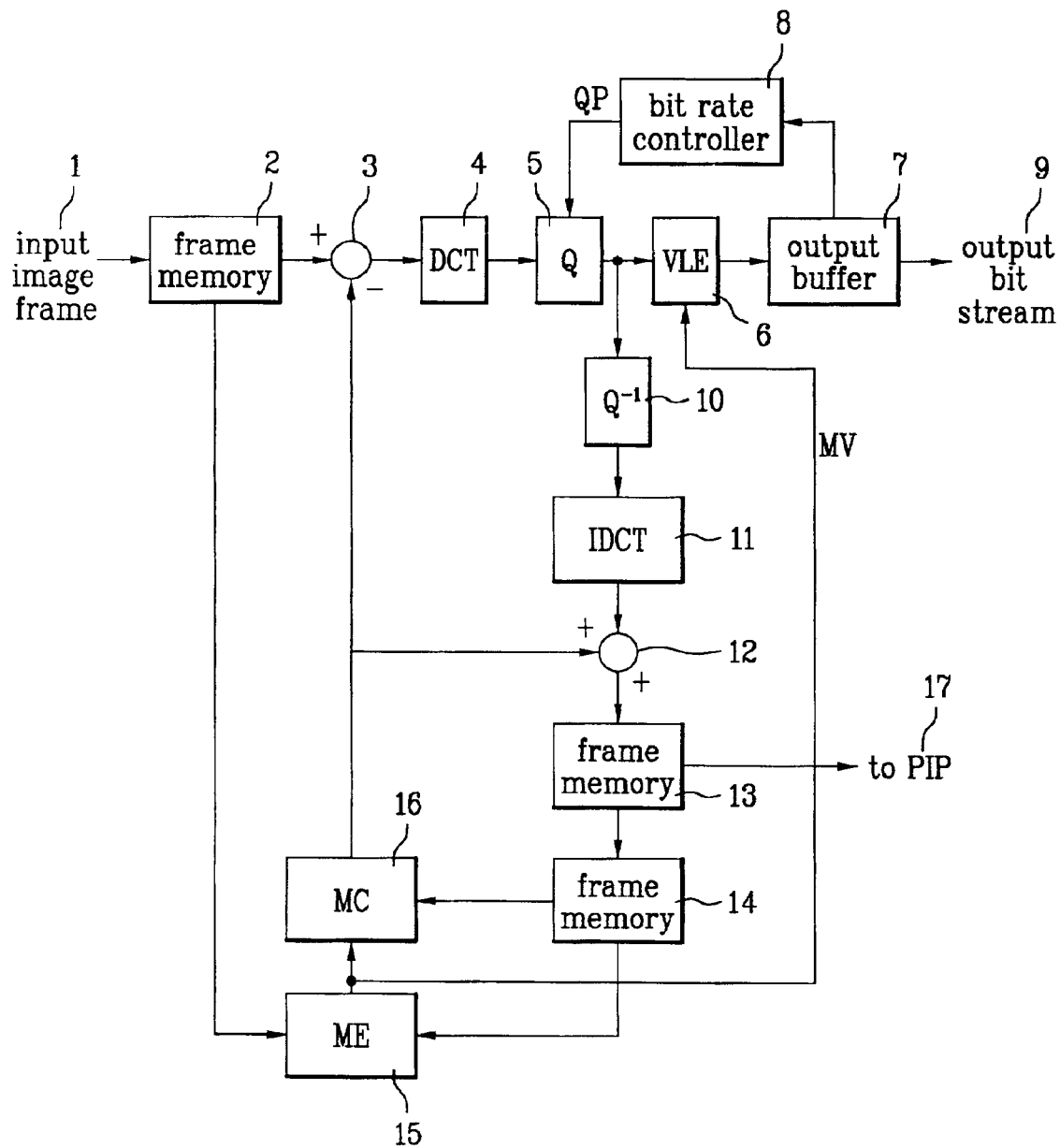
FIG. 1 illustrates a traditional motion picture encoder.
Figure 4:
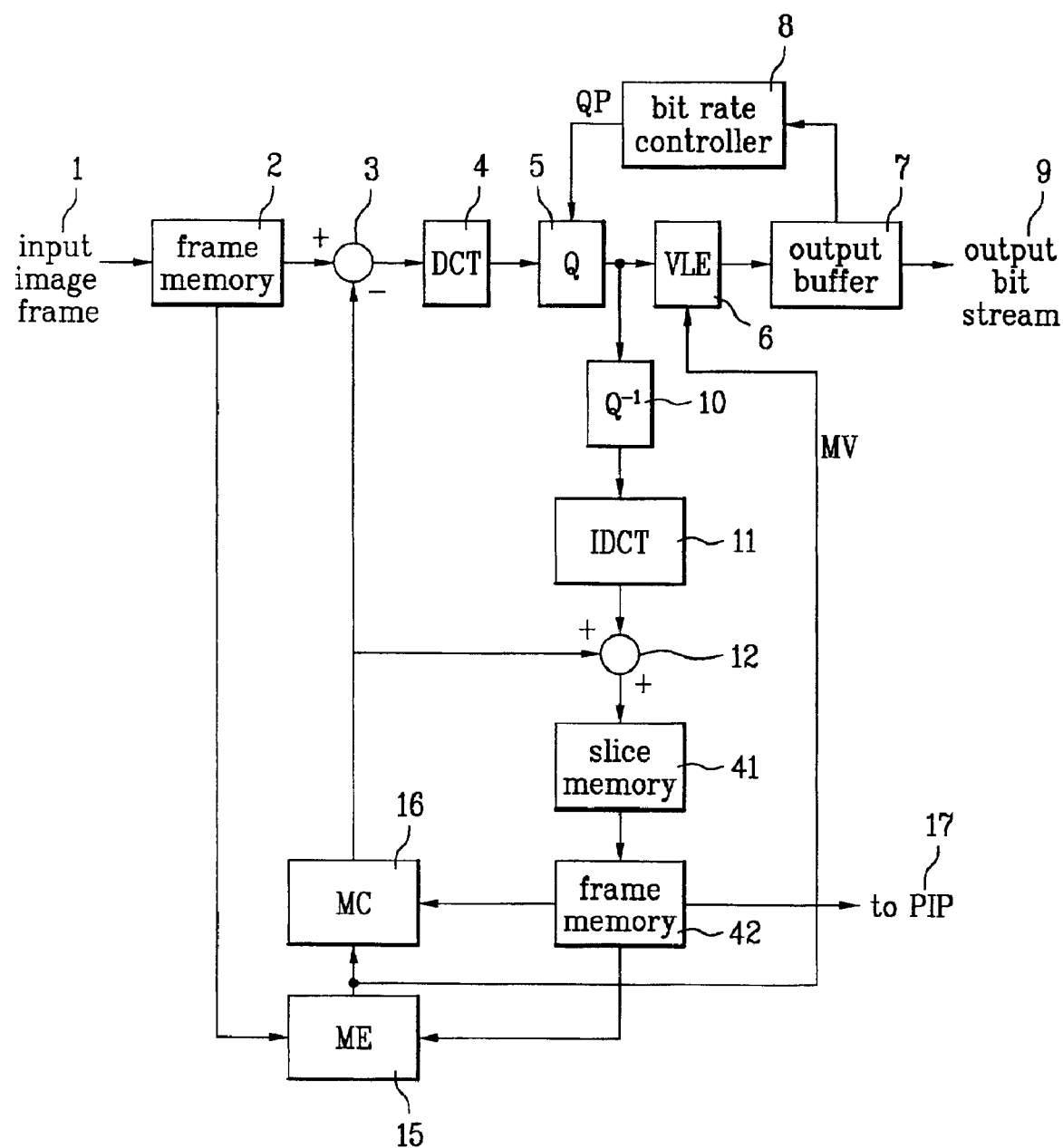
FIG. 4 illustrates a motion picture encoder according to the present invention.

FIG. 4 illustrates a motion picture encoder according to the present invention. As it can be seen from the figure, its structure is similar to the encoder shown in FIG. 1. However, the encoder shown in FIG. 4 includes a slice memory 41 for storing each restored slice of the Nth input image frame and a frame memory 42 storing a part of the restored Nth input image frame and a part of the restored (N−1)th input image frame.

Reference to the operational steps of the motion picture encoder shown in FIG. 4 is as follows. Initially, it is necessary to assume that a restored (N−1)th (previous) input image frame is already restored and stored in the frame memory 42.

Now, lets start with the frame memory 2. First, the frame memory 2 stores an Nth (current) input image frame received from a camera. The subtractor 3 generates a difference signal by subtracting the motion-compensated frame from the Nth input image frame stored in the frame memory 2. The motion compensator 16 generates the motion-compensated frame using the motion-estimated frame generated from the motion estimator 15 and the restored (N−1)th (previous) input image frame, which is stored in the frame memory 42.

Thereafter, the subtracted (difference) signal passes through the Discrete Cosine Transformer (DCT) 4, the Quantizer (Q) 5, and the Variable Length Encoder (VLE) 6 in order to be a compressed bit stream, and the bit stream is subsequently stored in the output buffer 7. The buffer 7 outputs the compressed bit stream to a channel.

The bit rate controller 8 controls the quantization parameter (QP) of the quantizer 5 in order to prevent any data overflow or underflow of the output buffer 7.

The signal outputted from the quantizer 5 pass through the inverse quantizer 10 and the Inverse Discrete Cosine Transformer (IDCT) 11 to be restored to the difference signal. Then the adder adds the restored difference signal with the motion-compensated frame to restore each slice of the Nth (current) input image frame. Thereafter, the slice memory 41 stores each restored slice of the Nth input image frame. Then the frame memory 42 receives each restored slice from the slice memory 41 and ultimately stores the restored Nth input image frame. The stored Nth input image frame will be used later when an (N+1)th (next) input image frame is received. The restored frame stored in the frame memory 42 may be inputted to the Picture-In-Picture (PIP) circuit.

Figure 2:
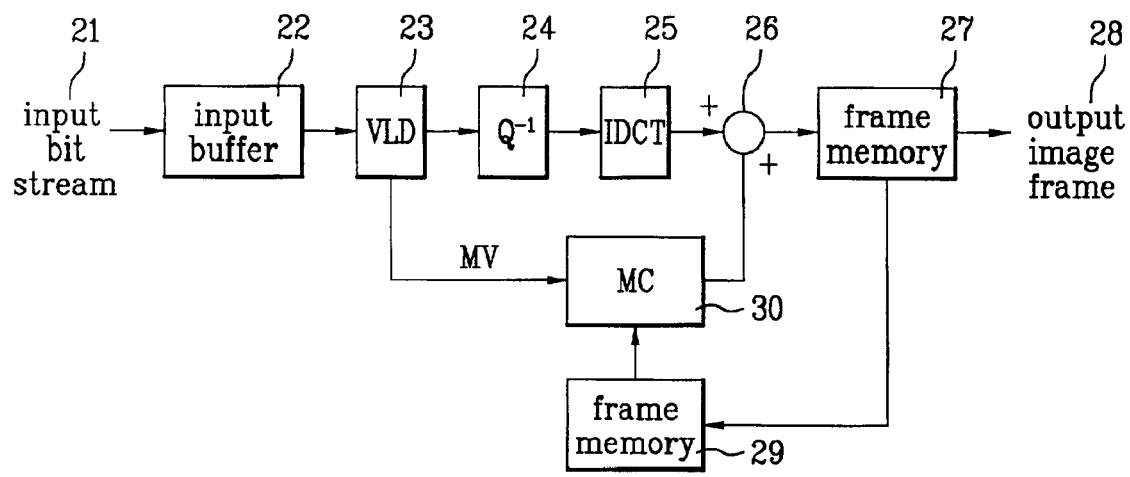
FIG. 2 illustrates a traditional motion picture decoder.
Figure 3:
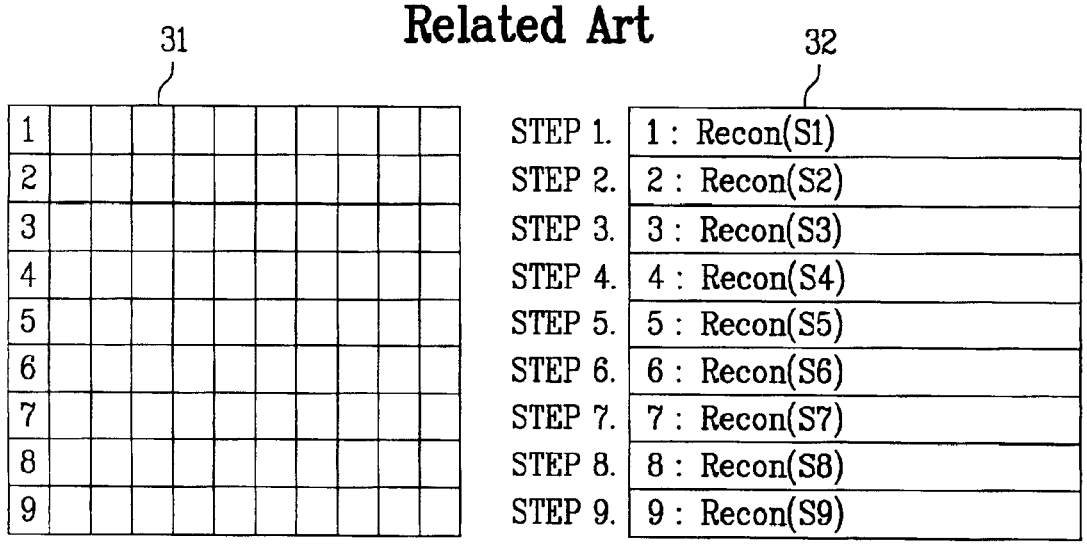
FIG. 3 illustrates frame memories used in a traditional encoder/decoder.
Figure 5:
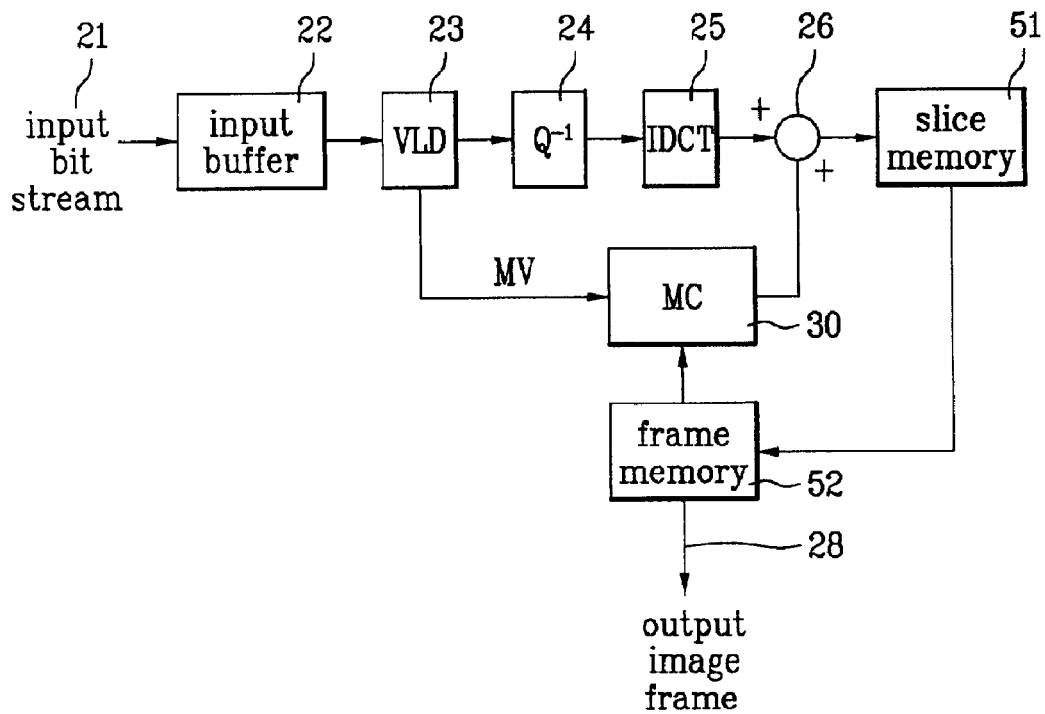
FIG. 5 illustrates a motion picture decoder according to the present invention.

FIG. 5 illustrates a motion picture decoder according to the present invention. As it is shown, its structure is also similar to the decoder shown in FIG. 2. However, the decoder shown in FIG. 5 includes a slice memory 51 for storing each restored slice of the Nth image frame. Another distinctive feature of the present invention is that the decoder further includes a frame memory 52 that stores a part of the restored Nth image frame and a part of the restored (N−1)th image frame.

Reference will now be made in detail to the operational steps of the decoder of the present invention, which is illustrated in FIG. 5. First of all, the input buffer 22 receives an input bit stream through a channel and stores the stream. Then the bit stream stored in the input buffer 22 passes through the variable length decoder (VLD) 23, the inverse quantizer 24, and the Inverse Discrete Cosine Transformer (IDCT) 25 in order to be restored to the original difference frame. Thereafter, the adder 26 adds the restored difference signal with the motion-compensated frame to restore the Nth image frame. The motion compensator generates the motion-compensated frame using the restored (N−1)th image frame, which is initially stored in the frame memory 52.

The slice memory 51 stores each restored slice of the Nth image frame. The frame memory, which already contains the restored (N−1) image frame, receives each slice of the Nth frame from the slice memory 51.

Figure 6:
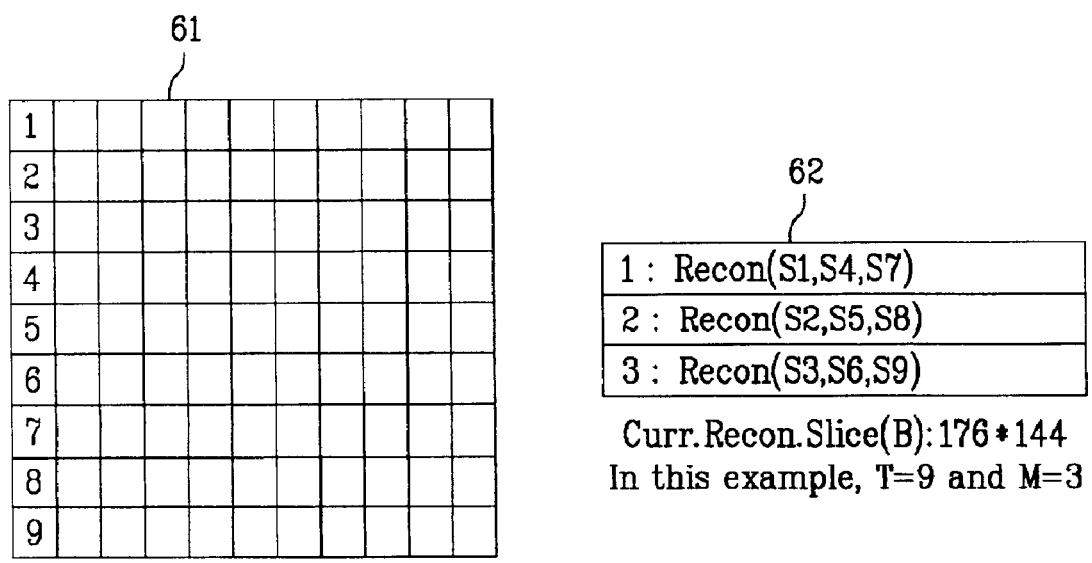
FIG. 6 illustrates a frame memory and a slice memory used in an encoder or decoder according to the present invention.

FIG. 6 illustrates a frame memory 61 and a slice memory 62 according to the present invention. The slice memory 62 temporarily stores each slice of the restored Nth image frame. The number of the slices that the slice memory 62 can store up to will be based on the type of the image format. Reference to this in more detail will be explained later in this section. The frame memory 61, which already contains the (N−1)th image frame, starts to store each slice of the Nrh frame. When all the slices of the Nth frame are restored, the frame memory 61 will contain only the Nth image frame.

FIG. 7 illustrates the steps of operating a frame memory and a slice memory according to the present invention. It will be assumed that the motion vector range is between −32 and 31.5 (F_code=2). It will be also assumed that the (N−1)th image frame is previously restored and is stored in the frame memory 61 shown in FIG. 5.

As shown in FIG. 7, the frame memory 61 includes a total of nine lines (1–9) and the slice memory 62 includes three banks. In the first step (step 1), the first slice of the Nth image frame is decoded, and the decoded slice is stored in a first bank. Next, in the second step (step 2), the second slice of the Nth image frame is decoded, and the decoded second slice is stored in a second bank. Similarly, the third slice is decoded, and the decoded slice is stored in a third bank (step 3).

In the fourth step (step 4), the first slice stored in the first bank is copied to the first line of the frame memory 61. This is because the fourth slice is not able to refer to the first slice when F_code=2. Thereafter, the fourth decoded slice will be stored in the first bank. Similarly, the second slice stored in the second bank will be copied to the second line of the frame memory 61, and the fifth decoded slice will be stored in the second bank. This will be repeated from the step 5 to step 9. Finally, in the step 10, each of the seventh, eighth, and ninth slices, which are stored in the first, second, and third banks, respectively, will be copied to the seventh, eighth, and ninth lines of the frame memory 61.

Since the fourth slice is not able to refer to the first slice in the step 4, a minimum memory space of one image frame and three image slices are required for decoding a motion picture image frame. In addition, when the motion vector range is between −16 and 15.5 (F_code=1), the image frame decoder needs a minimum memory space of one image frame and two image slices.

On the other hand, for encoding a motion picture image frame, same terminology can be used except that the encoder additionally needs a memory space of one image frame for storing an input image frame. Therefore, the minimum memory space of two frames and three slices are required for encoding an image frame when F_code=2.

Namely, since the memory space of one frame and three slices are required for decoding a YUV 4:2:0 QCIF image frame, the decoder requires a 50688 (=176×144×1.5+176×16×3×1.5) bytes memory. For encoding a same type of image frame, the encoder requires an 88704 (=176×144×1.5×2+176×16×3×1.5) bytes memory.

Similarly, a 177,408 (=352×288×1.5+352×16×3×1.5) bytes memory space is required for decoding a YUV 4:2:0 CIF image frame, and a 329472 (=352×288×1.5×2+352×16×3×1.5) bytes memory space is required for encoding a YUV 4:2:0 CIF image frame.

In conclusion, the memory space required for encoding or decoding an image frame is minimized using the encoder and decoder according to the present invention. Since the required memory space is minimized, it is much easier to embody the image data encoder/decoder in a single chip, and the required electric power can be significantly reduced.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. An apparatus for encoding an input image frame in an image processing system, the apparatus comprising:
   a slice memory storing image slices of a restored image frame having T image slices; and
   a first frame memory storing said restored image frame by copying each image slice stored in said slice memory until all of said T image slices are copied,
   wherein the slice memory stores only N number of slices in which N<T, and when an N+1 image slice is to be stored, an image slice stored in the slice memory is copied into the first frame memory and then N+1 image slice is copied into the slice memory.

2. The apparatus of claim 1, wherein said slice memory includes M memory banks, each of said M memory banks storing one image slice among said T image slices.

3. The apparatus of claim 2, wherein M is determined based on the range of motion vectors of said input image frame.

4. The apparatus of claim 1, wherein said image frame stored in said first frame memory is used for encoding a next input image frame.

5. The apparatus of claim 1 further comprising:
   a second frame memory storing said input image frame;
   a subtractor generating a difference signal by subtracting a motion-compensated frame from said stored input image frame;
   a Discrete Cosine Transformer (DCT) discrete cosine transforming the difference signal;
   a quantizer quantizing said discrete cosine transformed difference signal;
   a variable length encoder generating an output bit stream by performing a variable length encoding process on said quantized signal;
   a bit rate controller controlling a quantization parameter for said quantizer;
   an inverse quantizer restoring said difference signal by performing an inverse-quantizing process on said quantized signal;
   an Inverse DCT (IDCT) inverse discrete transforming the inverse-quantized difference signal; and
   an adder generating said restored image frame by adding said inverse-quantized difference signal to said motion-compensated frame.

6. The apparatus of claim 5, wherein said image frame stored in said first frame memory is used for encoding a next input image frame.

7. An apparatus for decoding an input bit stream corresponding to an input image frame in an image processing system, the apparatus comprising:

a slice memory storing each image slice of a restored image frame having T image slices; and a frame memory storing said restored image frame by copying each slice stored in said slice memory until all of said T image slices are copied, wherein the slice memory stores only N number of slices in which N<T, and when an N+1 image slice is to be stored, an image slice stored in the slice memory is copied into the first frame memory and then the N+1 image slice is copied into the slice memory.

8. The apparatus of claim 7, wherein said slice memory includes M memory banks, each of said M memory banks storing one image slice among said T image slices.

9. The apparatus of claim 8, wherein M is determined based on the range of motion vectors of said input image frame.

10. The apparatus of claim 7, wherein said restored image frame stored in said frame memory is used for decoding a next input bit stream corresponding to a next input image frame.

11. The apparatus of claim 7 further comprising:

an input buffer storing said input bit stream;

a decoder decoding said stored input bit stream;

an inverse quantizer inversely quantizing said decoded stream;

an inverse discrete cosine transformer (IDCT) performing an IDCT process on said inversely quantized stream;

a motion compensator generating a motion-compensated frame by compensating a previous image frame; and an adder generating said restored image frame by adding said IDCT processed stream to said motion-compensated frame.

12. The apparatus of claim 11, wherein said restored image frame stored in said frame memory is used for decoding a next input bit stream corresponding to a next input image frame.

13. A method of encoding/decoding an image frame having T image slices in an image processing system, the method comprising:

(a) restoring an ith slice of said image frame and storing said restored ith slice in an ith memory bank of a slice memory having M memory banks for i=1,2,3, ..., M;

(b) copying a [M(k−1)+j]th slice stored in a jth bank of said slice memory to frame memory, restoring a [Mk+j]th slice of said image frame, and storing said restored [Mk+j]th slice in said jth bank of said slice memory for j=1,2,3, ..., M and k=1;

(c) repeating (b) for k=2,3,4 ... until all of said T image slices are restored; and (d) copying a MK+lth slice stored in a lth bank of said slice memory to said frame memory for l=1,2,3, ..., L, where MK+L=T and L<M.

14. The method of claim 13, wherein M is determined based on the range of motion vectors of said image frame.

15. An apparatus for encoding an input image frame in an image processing system, the apparatus comprising:

a slice memory storing image slices of a restored image frame having T image slices; and a first frame memory storing said restored image frame by copying each image slice stored in said slice memory until all of said T image slices are copied, wherein said slice memory includes M memory banks, each of said M memory banks storing one image slice among said T image slices, and wherein M is determined based on the range of motion vectors of said input image frame.

16. An apparatus for decoding an input bit stream corresponding to an input image frame in an image processing system, the apparatus comprising:

a slice memory storing each image slice of a restored image frame having T image slices; and a frame memory storing said restored image frame by copying each slice stored in said slice memory until all of said T image slices are copied, wherein said slice memory includes M memory banks, each of said M memory banks storing one image slice among said T image slices, and wherein M is determined based on the range of motion vectors of said input image frame.

* * * * *